(12) United States Patent
Odru

(10) Patent No.: US 6,550,502 B2
(45) Date of Patent: Apr. 22, 2003

(54) COMPOSITE TUBE COMPRISING AN INNER CASING

(75) Inventor: Pierre Odru, Fontenay sous Bois (FR)

(73) Assignee: Institut Francais du Petrole, Rueil Malmaison cedex (FR)

( * ) Notice: Subject to any disclaimer, the term of this patent is extended or adjusted under 35 U.S.C. 154(b) by 0 days.

(21) Appl. No.: 10/128,286

(22) Filed: Apr. 24, 2002

(65) Prior Publication Data

US 2002/0157723 A1 Oct. 31, 2002

(30) Foreign Application Priority Data

Apr. 27, 2001 (FR) .............................................. 01 05841

(51) Int. Cl.⁷ ................................................ F16L 11/00
(52) U.S. Cl. ........................ 138/135; 138/139; 138/134; 138/131
(58) Field of Search ................................. 138/134, 129, 138/135, 133, 132, 144, 124, 125, 153, 174, 139, 131

(56) References Cited

U.S. PATENT DOCUMENTS

| | | | | |
|---|---|---|---|---|
| 5,110,644 A | * | 5/1992 | Sparks et al. ................ | 138/124 |
| 5,499,661 A | * | 3/1996 | Odru et al. .................. | 138/124 |
| 5,645,109 A | * | 7/1997 | Herrero et al. .............. | 138/130 |
| 6,098,667 A | * | 8/2000 | Odru ........................... | 138/131 |
| 6,099,925 A | | 8/2000 | Le Nouveau ............... | 428/36.9 |
| 6,109,833 A | | 8/2000 | Savy ........................ | 405/195.1 |
| 6,123,114 A | | 9/2000 | Seguin ........................ | 138/124 |
| 6,338,365 B1 | * | 1/2002 | Odru ........................... | 138/134 |

* cited by examiner

*Primary Examiner*—Patrick Brinson
(74) *Attorney, Agent, or Firm*—Antonelli, Terry, Stout & Kraus, LLP

(57) ABSTRACT

A structure of a multilayer tube includes at least one layer made of a composite material (2–8) having reinforcing fibers embedded in a polymer matrix, and at least one sealing sheath (1) made of a low-permeability polymer material. The tube has a metal carcass (9) interior to the sheath. In a variant, the carcass is made of stapled steel tape (10).

6 Claims, 3 Drawing Sheets

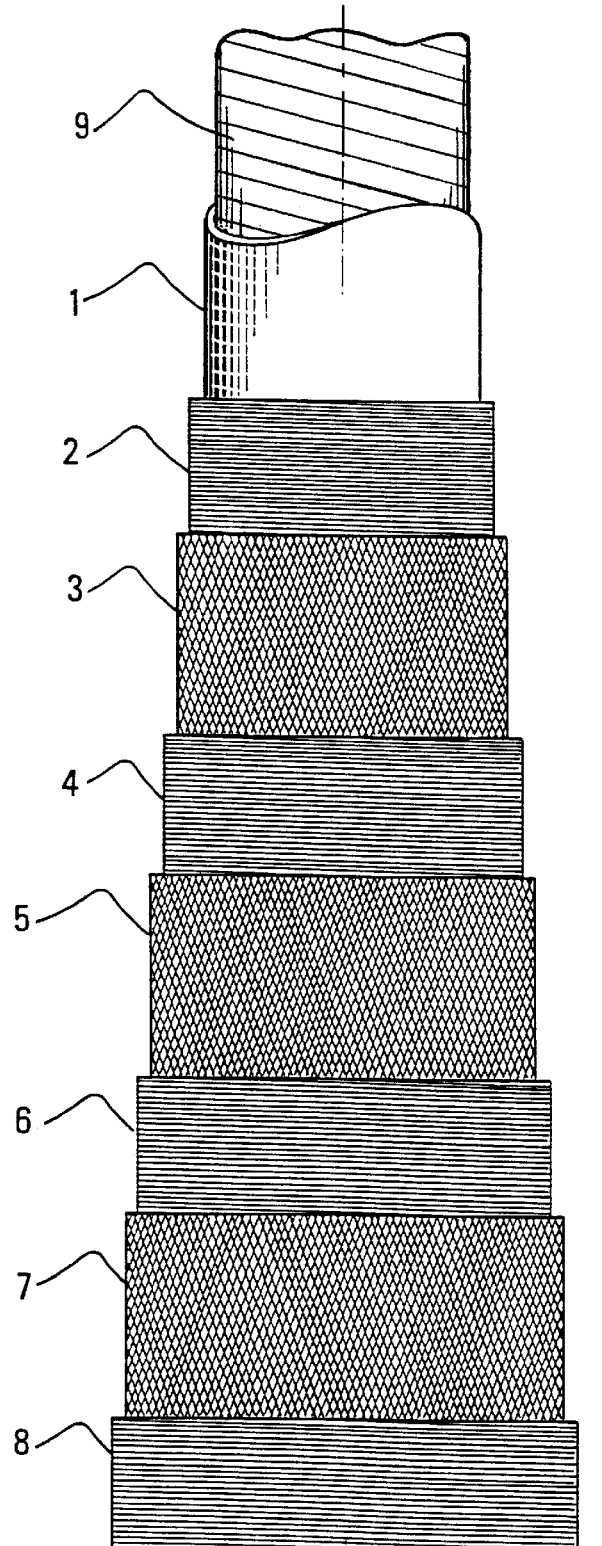

COMPOSITE TUBE COMPRISING AN INNER CASING

FIELD OF THE INVENTION

The present invention relates to a composite tubular pipe structure intended to carry liquid or gaseous products, in particular for offshore petroleum production.

Composite tubes usually consist of parallel fiber layers such as glass fibers, carbon fibers, aramid fibers, embedded in a matrix. Each one of these layers has a given thickness and forms a given angle with the axis of the tube so as to meet criteria relative to the mechanical resistance to the stresses applied to the tube. The matrix can be a thermosetting matrix, an epoxy resin for example. However, the present invention is not limited to a thermosetting matrix, other materials can be used without departing from the scope of the present invention, thermoplastics for example.

BACKGROUND OF THE INVENTION

Documents U.S. Pat. No. 5,110,644, U.S. Pat. No. 5,499,661, U.S. Pat. No. 5,091,230 describe composite tubes.

Such tubes can be used in particular in offshore oil prospecting and production operations, for example as risers connecting the sea bottom to the surface support for carrying the effluent produced. These composite tubes can notably advantageously replace, entirely or partially, rigid steel catenary risers, which are very heavy and subjected to stresses, notably bending stresses at the base, which can be very great and detrimental. A solution consists in using composite materials, much lighter, more flexible and fatigue resisting. The invention is not limited to these risers, it also relates to all the composite tubes having a sealing sheath that can be subjected to an external pressure.

In these types of tube, sealing against internal fluids is obviously fundamental, notably for the safety of the operations. It is however well-known that this type of composite is not considered to be sufficiently gas, water or hydrocarbon tight and at least one specific internal tube, referred to as liner, is required to provide sufficient sealing. This liner is generally made of organic materials, polymers of polyamide type or equivalent as regards sealing and implementation.

This polymer liner solution has the advantage of providing fluid tightness, good aging stability in a hydrocarbon environment, and it is compatible with the deformations of the composite, unlike a metal liner, for example in form of a continuous metal tube, cylindrical or corrugated. It however has several drawbacks, since it is notably difficult to obtain perfect and lasting sticking of the plastic layer to the upper composite layers made of fibers embedded in a matrix. Furthermore, gas permeation through the material of the inner liner, or permeation of sea water under pressure through the thickness of the composite layers is likely to produce a collapse pressure on this inner liner, which may eventually collapse.

SUMMARY OF THE INVENTION

The present invention thus relates to a multilayer tube comprising at least one layer of a composite material consisting of reinforcing fibers embedded in a matrix, at least one sealing sheath made of a polymer material intended to improve the tightness of this tube. The inner part of the tube consists of a metal carcass intended to protect the sheath against a possible external pressure.

According to the invention, the carcass is a flexible metal tube, for example made of a stapled steel tape or equivalent.

In a variant, the tube according to the invention comprises, on the outer surface thereof, a flexible metal tube, preferably made of stapled steel tape, intended to provide an external protection.

The tube according to the invention can comprise several sealing sheaths.

The present invention can be applied to constitute production risers of catenary or taut type, drilling risers, and even export lines connecting a production support and a loading buoy.

BRIEF DESCRIPTION OF THE DRAWINGS

Other features and advantages of the present invention will be clear from reading the description hereafter of non limitative examples, with reference to the accompanying drawings wherein:

FIG. 1 illustrates an example of a structure according to the invention,

DETAILED DESCRIPTION

Figure 2A:
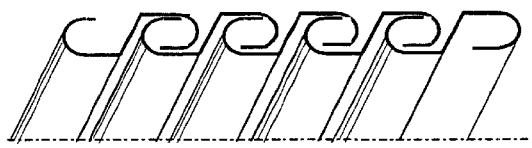
FIGS. 2A, 2B, 2C and 2D illustrate examples of tube casings according to the invention.

FIG. 1 shows, from reference numbers 1 to 9, a series of layers forming a tube according to the invention. Reference number 1 designates the sealing layer made of plastic material thermoplastic polymer or elastomer. Reference numbers 2 to 8 refer to layers comprising each fibers arranged at equal angles or symmetrical in relation to the axis of the tube, and embedded in a matrix. This matrix adheres to the fibers. Some of these layers can be suited to withstand more particularly the pressure prevailing inside the tube or internal pressure, and others more particularly withstand traction. The pressure-resisting layers comprise then groups of fibers wound at a high angle in relation to the axis of the tube (2, 4, 6 and 8 for example), whereas the traction-resisting layers comprises fibers wound at a small angle in relation to the axis of the tube (3, 5, 7 for example). According to the invention, sealing sheath 1 is implemented on a metal carcass 9. Thus, sheath 1 is supported by the carcass so as to withstand the external pressure. The external pressure that can be exerted on the sheath can come from the external fluid flowing through the non impermeable composite layers, for example as a result of matrix cracking, or because of the gas that has flowed through the sheath by permeability and remains trapped by the upper layers.

The flexible structure of the metal tube forming the carcass is such that it follows without detrimental stresses the longitudinal bending and tensile deformations of the composite tube which are much greater than the deformations of steel. As regards the internal pressure stresses, it undergoes no circumferential deformation because it remains pressure balanced since it is not liquid or gas tight.

Furthermore, this internal structure protects mechanically the sealing sheath from wear and destruction that may be caused by the bit passing into the inner space of the tube.

Finally, in the non limitative case of composite catenary tubes, the latter are penalized, in particular in the case of gas production, by their too low weight. The metal carcass according to the invention also acts as a ballast.

Figure 2B:
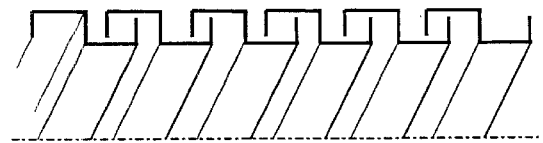
Figure 2C:
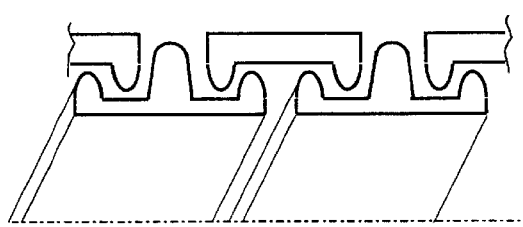
Figure 2D:
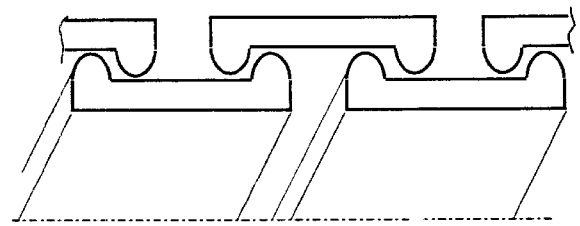

FIGS. 2A–D illustrate types of flexible metal carcass:

FIG. 2A shows a carcass made of stapled steel tape,

FIG. 2B shows a carcass made-of self-stapled Zeta,

FIG. 2C shows a T-shaped carcass stapled by a U-shaped staple, or T-shaped (not shown), FIG. 2D shows a C-shaped (or U-shaped) carcass.

The structures shown are not described more in detail here since they are known to the man skilled in the art of hydrocarbon production. These flexible metal tube structures are made from stapled or self-stapled wires, but they can also be made with rings of suitable section stapled to one another.

The example of FIG. 2A is preferred because it currently corresponds to a good quality-price ratio.

Figure 3:
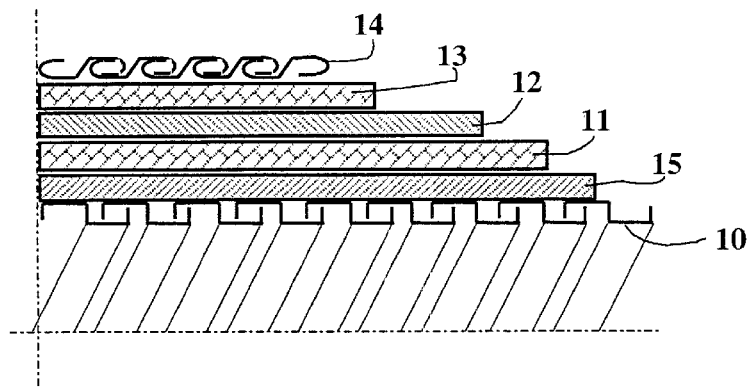
FIG. 3 shows a variant according to the invention.

FIG. 3 illustrates variants of the composite tube according to the invention. Reference number 10 refers to a metal carcass on which a sealing sheath 15 is applied, by extrusion for example. On this core, several composite layers (11, 13) made of coated fibers are deposited by filament winding. In order to protect them against external mechanical stresses, a metal layer made of steel tape 14 can surround the whole of the tube. In a variant, another sealing sheath made of polymer material 12 can be interposed between reinforcing fiber layers so as to reinforce or to complete the sealing function.

Figure 4:
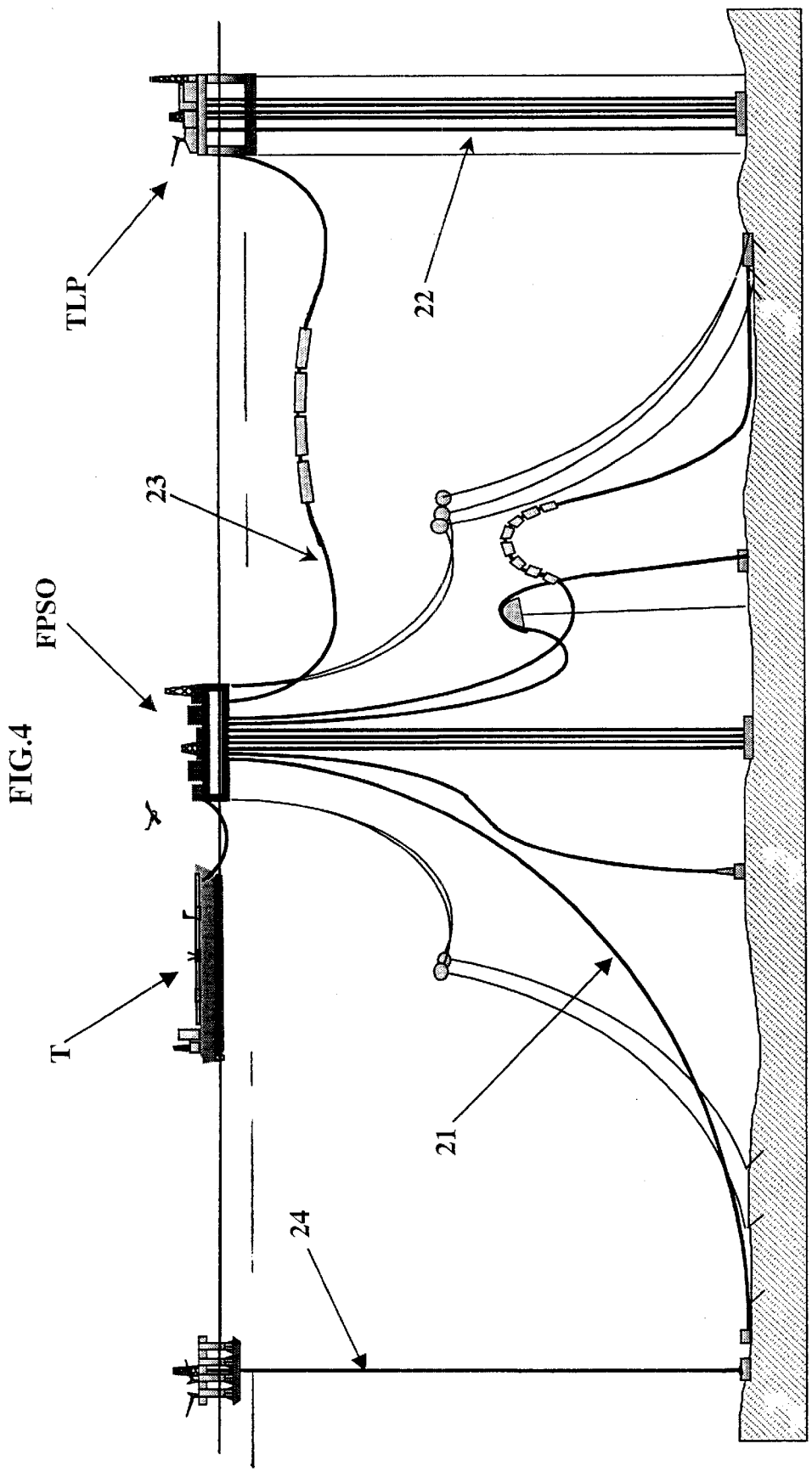
FIG. 4 illustrates various applications of the present invention.

FIG. 4 shows various possible applications of the composite tubes according to the invention. Reference number 1 refers to a catenary production riser. Reference number 2 refers to all of the production risers of a TLP type production platform. Reference number 3 refers to an export line for carrying the effluent produced, for example by the TLP, to the loading means. Reference number 4 refers to a drilling riser. These various lines can consist of at least one more or great length of a tube according to the present invention.

What is claimed is:

1. A multilayer tube comprising:
   a metal carcass;
   at least one sealing sheath made of a low-permeability polymer material provided on an outside of the metal carcass; and
   at least one pressure resisting layer comprising a polymer matrix provided on an outside of said at least one sealing sheath, the at least one pressure resisting layer including reinforcing fibers embedded in the polymer matrix.

2. A tube as claimed in claim 1, wherein said the metal carcass a stapled steel tape.

3. A tube as claimed in claim 1, further comprising a flexible metal tube provided on an outside of the at least one pressure resisting layer.

4. A tube as claimed in claim 1, wherein a plurality of sealing sheaths are provided separated by the at least one pressure resisting layer.

5. A catenary type riser comprising the tube as claimed in claim 1.

6. An export line comprising the tube as claimed in claim 1.

* * * * *